(12) United States Patent
Mizuno et al.

(10) Patent No.: US 8,379,128 B2
(45) Date of Patent: Feb. 19, 2013

(54) SENSOR APPARATUS

(75) Inventors: Seiichiro Mizuno, Hamamatsu (JP); Haruhiro Funakoshi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 13/037,038

(22) Filed: Feb. 28, 2011

(65) Prior Publication Data

US 2011/0149134 A1    Jun. 23, 2011

Related U.S. Application Data

(60) Division of application No. 12/857,312, filed on Aug. 16, 2010, now Pat. No. 7,956,917, which is a continuation of application No. 11/596,069, filed as application No. PCT/JP2005/008305 on May 2, 2005, now abandoned.

(30) Foreign Application Priority Data

May 10, 2004 (JP) ................ P2004-140413

(51) Int. Cl.
- *H04N 5/335* (2006.01)
- *H04N 5/232* (2006.01)
- *H04N 5/217* (2006.01)
- *G11C 27/02* (2006.01)

(52) U.S. Cl. ........... 348/308; 348/307; 348/222.1; 348/241; 327/91

(58) Field of Classification Search ........... 348/308, 348/307, 222.1, 241; 345/91
See application file for complete search history.

(56) References Cited

U.S. PATENT DOCUMENTS

| | | | |
|---|---|---|---|
| 6,166,769 A | 12/2000 | Yonemoto et al. | |
| 7,002,628 B1 | 2/2006 | Panicacci | |
| 2002/0012058 A1 | 1/2002 | Mizuno | |
| 2003/0011407 A1 | 1/2003 | Ishihara et al. | |

FOREIGN PATENT DOCUMENTS

| | | |
|---|---|---|
| EP | 1 143 706 | 10/2001 |
| EP | 1 267 571 | 12/2002 |
| JP | 59-151455 | 8/1984 |
| JP | 62-151729 | 7/1987 |
| JP | 2-54129 | 2/1990 |
| JP | 03-283979 | 12/1991 |
| JP | 4-290932 | 10/1992 |
| JP | 5-336450 | 12/1993 |
| JP | 6-6802 | 1/1994 |
| JP | 6-19624 | 1/1994 |
| JP | 06-105186 | 12/1994 |
| JP | 7-30820 | 1/1995 |
| JP | 8-84252 | 3/1996 |
| JP | 9-51476 | 2/1997 |
| JP | 10-510112 | 9/1998 |
| JP | 11-177766 | 7/1999 |
| WO | 00/45592 | 8/2000 |
| WO | 01/11870 | 2/2001 |

*Primary Examiner* — Chieh M Fan
*Assistant Examiner* — Quang Le
(74) *Attorney, Agent, or Firm* — Drinker Biddle & Reath LLP

(57) ABSTRACT

The present invention relates to a sensor apparatus having a structure capable of obtaining digital values of signal components with a high accuracy using an A/D conversing circuit with the outputted digital value thereof having a small number of expressive bits. In the sensor apparatus, a voltage value corresponding to the amount of incident light to a photodiode is held by a holding circuit through an integrating circuit and a CDS circuit. Meanwhile, a voltage value corresponding to the amount of incident light to an adjacent photodiode is held by another holding circuit through an integrating circuit and a CDS circuit. The voltage values held by the respective different holding circuits are inputted to a subtracting circuit through different paths. The subtracting circuit outputs a voltage value corresponding to the difference between the two inputted voltage values. In an A/D converting section, the difference voltage outputted from the subtracting circuit is converted into a digital value.

4 Claims, 6 Drawing Sheets

SENSOR APPARATUS

This is a divisional application of application Ser. No. 12/857,312, having a filing date of Aug. 16, 2010 now U.S. Pat. No. 7,956,917, which is a continuation of prior application Ser. No. 11/596,069, having a §371 date of Jul. 19, 2007 now abandoned, which is a national stage filing based on PCT International Application No. PCT/JP05/08305, filed on May 2, 2005. The copending application Ser. Nos. 11/596,069 and 12/857,312 are incorporated by reference herein in their entireties.

TECHNICAL FIELD

The present invention relates to a sensor apparatus including a plurality of sensor elements.

BACKGROUND ART

In sensor apparatuses including a plurality of sensor elements, voltage values corresponding to the detection result of the amount of sensing by the respective sensor elements are outputted from a signal processing circuit, and further digital values corresponding to the voltage values are outputted from an A/D conversing circuit. Then, one- or two-dimensional distribution of the amount of sensing (e.g. light intensity, temperature, displacement) is obtained based on the digital values corresponding to the amount of sensing for the respective sensor elements. As an example of such a sensor apparatus, there can be cited an image pickup apparatus including a plurality of photodiodes that are arranged one or two-dimensionally (refer to Patent Document 1).

Patent: Document 1: Japanese Patent Application Laid-Open No. 119-51476

DISCLOSURE OF THE INVENTION

Problem to be Solved by the Invention

The inventors have studied conventional sensor apparatuses in detail, and as a result, have found problems as follows. That is, the amount of sensing detected by such a sensor apparatus as described above may include not only a signal component that is supposed to be detected but also a noise component (disturbing light component, background light component) that is superimposed on the signal component. When the noise component (disturbing light component, background light component) is significantly indefinite, the A/D conversing circuit requires 10-bit outputted digital values for inputted voltage values with noise components (disturbing light components, background light components) superimposed on signal components, though 8-bit outputted digital values would suffice for, for example, inputted voltage values including signal components only, to A/D-convert the signal components with an accuracy equivalent to the 8-bit case.

When the outputted digital value of the A/D conversing circuit has a large number of bits, the A/D conversing circuit results in a long conversion time, large power consumption, and large circuit scale. It is generally necessary to A/D-convert the detection result of the amount of sensing by all sensor elements within a certain time period, which may require parallel processing using a plurality of A/D conversing circuits, resulting in a larger power consumption and larger circuit scale.

In order to overcome the above-mentioned problems, it is an object of the present invention to provide a sensor apparatus capable of obtaining digital values of signal components with a high accuracy, even in the case of the amount of sensing with noise components (disturbing light components, background light components) superimposed on the signal components, using an A/D conversing circuit with the outputted digital value thereof having a small number of bits.

Means for Solving Problem

A sensor apparatus according to the present invention comprises a sensor array section, a difference operating section, and an A/D converting section. In a first aspect of the sensor apparatus, the sensor array section includes N sensor elements (N represents an integer of 2 or more) and outputs a voltage value in response to the result of sensing by the n-th sensor element ("n" represents any integer of 1 or more but N or less) among the N sensor elements. The difference operating section receives N voltage values $V_1$ to $V_N$ outputted from the sensor array section and outputs a voltage value $U_n$ ($n \neq 1$) corresponding to the difference ($V_n - V_{n-1}$) between voltage values $V_n$ and $V_{n-1}$. The A/D converting section receives the voltage value $U_n$ outputted from the difference operating section, converts the voltage value IL into a digital value, and then outputs the converted digital value.

In the sensor apparatus according to the above-described first aspect, the A/D converting section may converts at least one voltage value among the N voltage values $V_1$ to $V_N$ into a digital value, and then outputs the converted digital value.

Also, in a second aspect of the sensor apparatus, the difference operating section may receives N voltage values $V_1$ to $V_N$ outputted from the sensor array section and outputs a voltage value $W_n$ corresponding to the difference ($V_n - V_{n0}$) between a specific voltage value $V_{n0}$ and the voltage value $V_n$ among the N voltage values $V_1$ to $V_N$. In this case, the A/D converting section receives the voltage value $W_n$ outputted from the difference operating section, converts the voltage value $W_n$ into a digital value, and then outputs the converted digital value.

In the sensor apparatus according to the above-described second aspect, the A/D converting section may converts the specific voltage value $V_{n0}$ into a digital value, and then outputs the converted digital value.

The sensor apparatus according to the present invention preferably further includes a holding section that receives the N voltage values $V_1$ to $V_N$ outputted from the sensor array section and once holds the N voltage values $V_1$ to $V_N$. In this case, the difference operating section outputs the voltage value $U_n$ or $W_n$ based on the N voltage values $V_1$ to $V_N$ held by the holding section.

In the sensor apparatus according to the present invention, each of the N sensor elements preferably includes a photodiode. In this case, the one- or two-dimensional intensity distribution of incident light can be detected. Also, even when the intensity of incident light may include signal components and noise components (disturbing light components, background light components) and the noise components (disturbing light components, background light components) may be significantly indefinite, it is possible to obtain digital values of the signal components with a high accuracy using an A/D conversing circuit with the outputted digital value thereof having a small number of bits.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

Effect of the Invention

In accordance with the sensor apparatus according to the present invention, it is possible to obtain digital values of signal components with a high accuracy, even in the case of the amount of sensing with noise components (disturbing light components, background light components) superimposed on the signal components, using an A/D conversing circuit with the outputted digital value thereof having a small number of bits.

Figure 1:
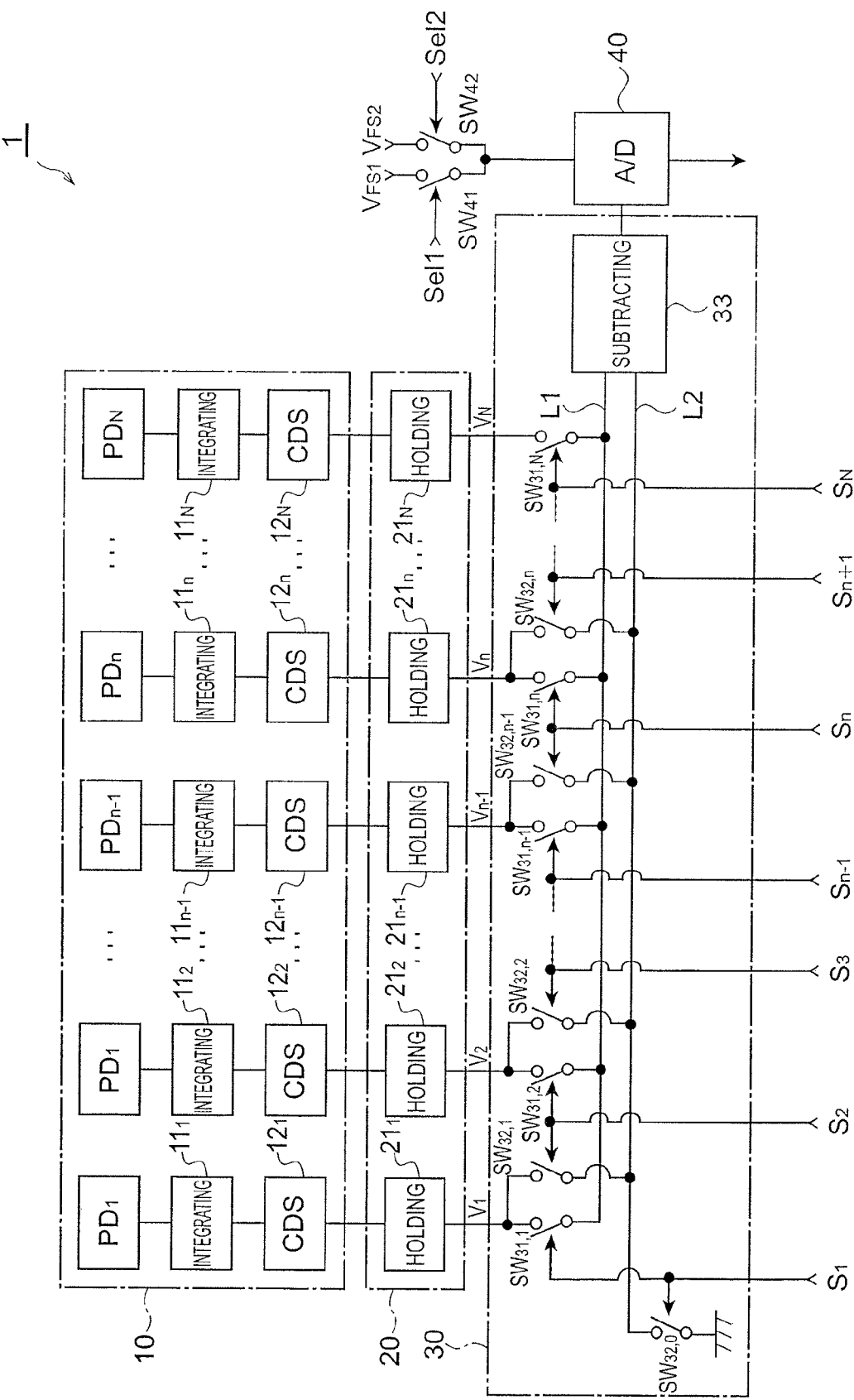
FIG. 1 is a view showing the overall configuration of a sensor apparatus according to a first embodiment of the present invention.

DESCRIPTION OF THE REFERENCE NUMERALS 1, 2 . . . sensor apparatuses; 10 . . . sensor array section; 11 . . . integrating circuit; 12 . . . CDS circuit; 20 . . . holding section; 30, 30A . . . difference operating sections; 33 . . . subtracting circuit; and 40 . . . A/D converting section.

BEST MODES FOR CARRYING OUT THE INVENTION

In the following, embodiments of a sensor apparatus according to the present invention will be explained in detail with reference to FIGS. 1 to 6. In the explanation of the drawings, constituents identical to each other will be referred to with numerals identical to each other without repeating their overlapping descriptions.

First Embodiment

First, a sensor apparatus according to a first embodiment of the present invention will be explained. FIG. 1 is a view showing the overall configuration of the sensor apparatus according to the first embodiment of the present invention. The sensor apparatus 1 shown in FIG. 1 comprises a sensor array section 10, a holding section 20, a difference operating section 30, and an A/D converting section 40.

The sensor array section 10 includes N photodiodes $PD_1$ to $PD_N$, N integrating circuits $11_1$ to $11_N$, and N CDS circuits $12_1$ to $12_N$. Also, the holding section 20 includes N holding circuits $21_1$ to $21_N$. Each of the photodiodes $PD_1$ to $PD_N$ has a common composition, each of the integrating circuits $11_1$ to $11_N$ also has a common composition, each of the CDS circuits $12_1$ to $12_N$ also has a common composition, and each of the holding circuits $21_1$ to $21_N$ also has a common composition. The N photodiodes $PD_1$ to $PD_N$ are arranged one-dimensionally. The n-th integrating circuit n-th CDS circuit $12_n$, and n-th holding circuit $21_n$ are provided correspondingly to the n-th photodiode $PD_n$. Here, N represents an integer of 2 or more. Also, "n" represents any integer of 1 or more but N or less, unless otherwise specified.

The photodiode $PD_n$ generates electric charges corresponding to the amount of incident light and outputs the electric charges to the integrating circuit $11_n$. Each integrating circuit $11_n$ accumulates the electric charges outputted from the photodiode $PD_n$ into a capacitive element and outputs a voltage value corresponding to the amount of accumulated charge to the CDS circuit $12_n$. The CDS circuit $12_n$ receives the voltage value outputted from the integrating circuit $11_n$ and outputs a voltage value corresponding to the change of the inputted voltage value after a reference time based on the inputted voltage value at the reference time to the holding circuit $21_n$. That is, the sensor array section 10 includes the N photodiodes $PD_1$ to $PD_N$ as sensor elements and outputs a voltage value corresponding to the detection result of light by the photodiode $PD_n$. The holding circuit $21_n$ receives the voltage value outputted from the CDS circuit $12_n$ and outputs the voltage value $V_n$ held therein.

The difference operating section 30 includes switches $SW_{31,1}$ to $SW_{31,N}$, switches $SW_{32,0}$ to $SW_{32,N-1}$, and a subtracting circuit 33. The output terminal of the holding circuit $21_n$ is connected to a wiring L1 via the switch $SW_{31,n}$ and to a wiring L2 via the switch $SW_{32,n}$. However, the output terminal of the N-th holding circuit $21_N$ is connected to the wiring L1 via the switch $SW_{31,N}$ but may not be connected to the wiring L2 via a switch. Also, the wiring L2 is connected with the ground potential via the switch $SW_{32,0}$. The switches $SW_{31,n}$ and $SW_{32,n-1}$ open and close based on the level of a control signal $S_n$. The subtracting circuit 33 outputs a voltage value corresponding to the difference between voltage values to be inputted through the respective wirings L1 and L2.

The A/D converting section 40 is used together with switches $SW_{41}$ and $SW_{42}$. The A/D converting section 40 receives one of a voltage value $V_{FS1}$ to be inputted via the switch $SW_{41}$ and a voltage value $V_{FS2}$ to be inputted via the switch $SW_{42}$ as a full scale in A/D conversion. Then, the A/D converting section 40 converts the voltage value outputted from the subtracting circuit 33 into a digital value at a resolution of one $2^M$-th of the full scale (voltage value $V_{FS1}$ or $V_{FS2}$), and then outputs the converted digital value. It is noted that M represents the number of bits of the outputted digital value. It is preferable that the voltage value $V_{FS1}$ is greater than $V_{FS2}$ and the ratio therebetween be a power of two. The switch $SW_{41}$ opens and closes based on the level of a control signal Sel1, while the switch $SW_{42}$ opens and closes based on the level of a control signal Sel2.

Figure 2:
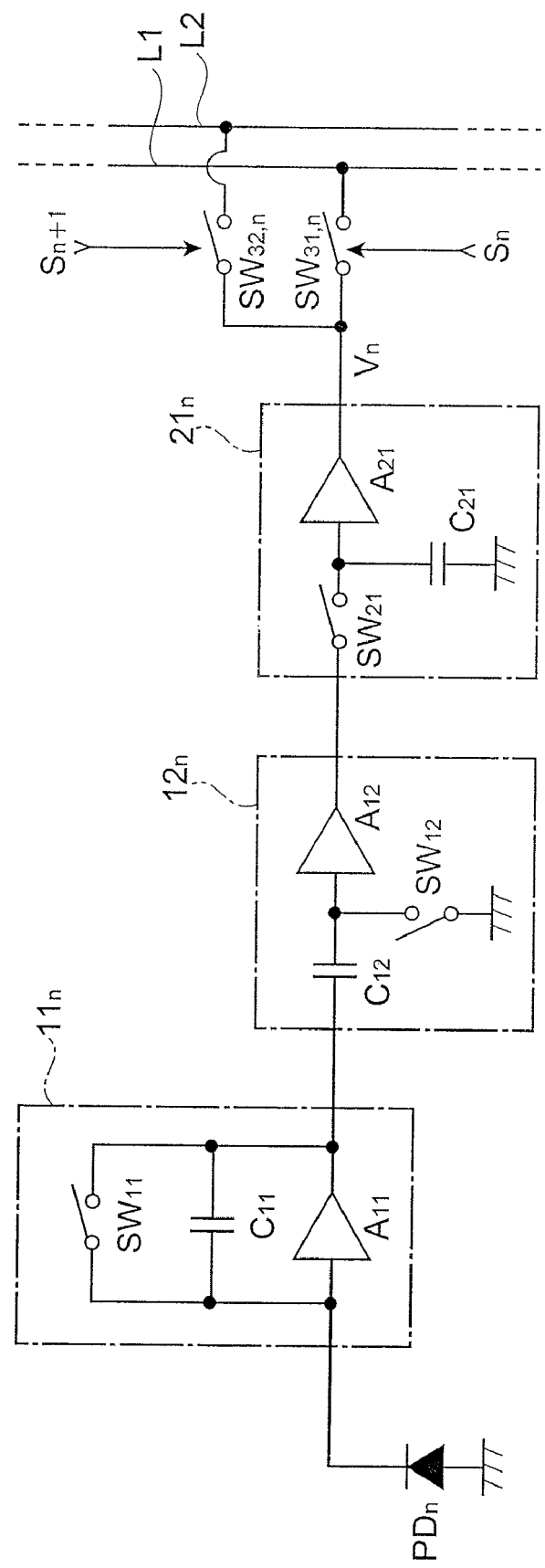
FIG. 2 is a circuit diagram including a photodiode $PD_n$, an integrating circuit $11_n$, a CDS circuit $12_n$, and a holding circuit $21_n$ in the sensor apparatus according to the first embodiment.

FIG. 2 is a circuit diagram including a photodiode $PD_n$, an integrating circuit $11_n$, a CDS circuit $12_n$, and a holding circuit $21_n$ in the sensor apparatus 1 according to the first embodiment. The anode terminal of the photodiode $PD_n$ is grounded, while the cathode terminal thereof is connected to the input terminal of the integrating circuit $11_n$, and the photodiode $PD_n$ generates electric charges corresponding to the amount of incident light and outputs the electric charges to the integrating circuit $11_n$.

The integrating circuit $11_n$ includes an amplifier $A_{11}$, a capacitive element $C_{11}$, and a switch $SW_{11}$. The input terminal of the amplifier $A_{11}$ is connected to the cathode terminal of the photodiode $PD_n$. The capacitive element $C_{11}$ and switch $SW_{11}$ are provided between the input and output terminals of the amplifier $A_n$ by being connected parallel with each other. The outputted voltage value of the integrating circuit $11_n$ is initialized by closing the switch $SW_{11}$ so that the capacitive element $C_{11}$ is discharged. The integrating circuit $11_n$ also accumulates electric charges outputted from the photodiode $PD_n$ into the capacitive element $C_{11}$ when the switch $SW_{11}$ is opened, and then outputs a voltage value corresponding to the amount of accumulated charge to the CDS circuit $12_n$.

The CDS circuit $12_n$ includes an amplifier $A_{12}$, a capacitive element $C_{12}$, and a switch $SW_{12}$. The input terminal of the amplifier $A_{12}$ is connected to the amplifier $A_n$ in the integrating circuit $11_n$ via the capacitive element $C_{12}$ and is grounded via the switch $SW_{12}$. The CDS circuit $12_n$ receives the voltage value outputted from the integrating circuit $11_n$ and outputs a voltage value corresponding to the change of the inputted voltage value after a reference time (when the switch $SW_{12}$ is opened) based on the inputted voltage value at the reference time from the amplifier $A_{12}$ to the holding circuit $21_n$.

The holding circuit $21_n$ includes an amplifier $A_{21}$, a capacitive element $C_{21}$, and a switch $SW_{21}$. The input terminal of the amplifier $A_{21}$ is connected to the amplifier $A_{12}$ in the CDS circuit $12_n$ via the switch $SW_{21}$ and is grounded via the capacitive element $C_{21}$. The output terminal of the amplifier $A_{21}$ is connected to the wiring L1 via the switch $SW_{31,n}$ and to the wiring L2 via the switch $SW_{32,n}$. The holding circuit $21_n$ holds the voltage value, which is outputted from the CDS circuit $12_n$, at a time when the switch $SW_{21}$ is opened, in the capacitive element $C_{21}$ also after the time of the state variation, and then outputs a voltage value $V_n$ corresponding to the held voltage value from the amplifier $A_{21}$.

The operation of the photodiode $PD_n$, integrating circuit $11_n$, CDS circuit $12_n$, and holding circuit $21_n$ is as follows.

That is, when the switch $SW_{11}$ in the integrating circuit $11_n$ is opened, electric charges outputted from the photodiode $PD_n$ are accumulated into the capacitive element $C_{11}$, and then a voltage value corresponding to the amount of accumulated charge is outputted from the integrating circuit $11_n$. As the amount of charge accumulated in the capacitive element $C_{11}$ increases gradually, the voltage value outputted from the integrating circuit $11_n$ varies. While the switch $SW_{11}$ in the integrating circuit $11_n$ is opened, the switch $SW_{12}$ in the CDS circuit $12_n$ is opened at a first time, and then the switch $SW_{21}$ in the holding circuit $21_n$ is opened at a second time. The voltage value outputted from the CDS circuit $12_n$ after the first time corresponds to the change of the voltage value outputted from the integrating circuit $11_n$ based on the voltage value outputted from the integrating circuit $11_n$ at the first time. Then, the voltage value $V_n$ held by the holding circuit $21_n$ after the second time corresponds to the voltage value outputted from the CDS circuit $12_n$ at the second time.

That is, the voltage value $V_n$ held by the holding circuit $21_n$ after the second time corresponds to the difference between the voltage values outputted from the integrating circuit $11_n$ at the first and second time, and when the time difference between the first and second time is constant, corresponds to the intensity of light incident to the photodiode $PD_n$. It is noted that the N integrating circuits $11_1$ to $11_N$ operate at the same timing; the N CDS circuits $12_1$ to $12_N$ also operate at the same timing; and the N holding circuits $21_1$ to $21_N$ also operate at the same timing. Therefore, a voltage value $V_n$ corresponding to the amount of incident light to the photodiode $PD_n$ during a common period of time is to be held by the holding section 20.

Figure 3:
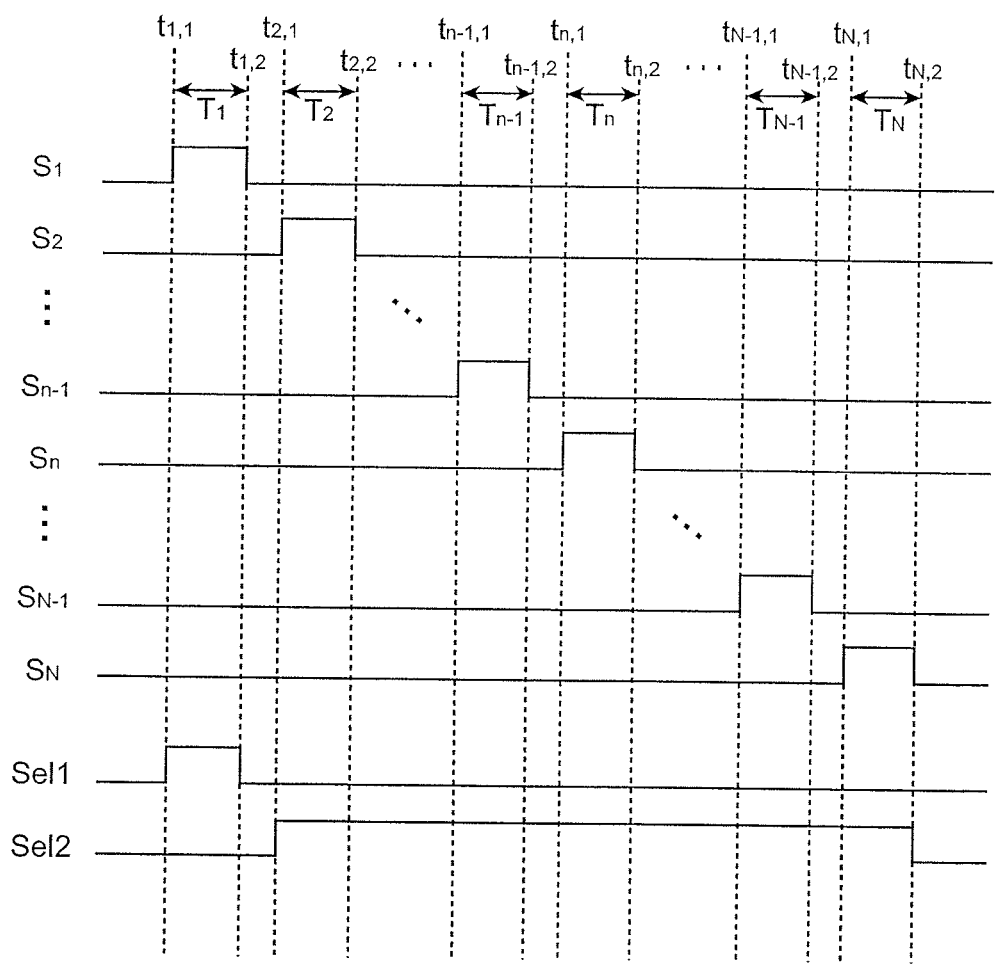
FIG. 3 is a timing chart for explaining the operation of a difference operating section and an A/D converting section in the sensor apparatus according to the first embodiment.

Next, the operation of the difference operating section 30 and the A/D converting section 40 in the sensor apparatus 1 according to the first embodiment will be explained. FIG. 3 is a timing chart for explaining the operation of the difference operating section 30 and the A/D converting section 40 in the sensor apparatus 1 according to the first embodiment. FIG. 3 shows a timing chart when the difference operating section 30 and A/D converting section 40 process voltage values $V_1$ to $V_N$ are held by the holding section 20 as described above. It is noted that not only the above-described operation of the sensor array section 10 and holding section 20 but also the operation of the difference operating section 30 and A/D converting section 40 to be explained hereinafter is performed based on various control signals outputted from a control section (not shown in the figures). FIG. 3 shows the level of each control signal $S_n$ to be inputted to the difference operating section 30, the level of a control signal Sel1 for instructing the switch $SW_{41}$ to open and close, and the level of a control signal Sel2 for instructing the switch $SW_{42}$ to open and close in this order from the top.

As shown in FIG. 3, the control signals $S_1$ to $S_N$ are made high sequentially. During the time period $T_n$ from time $t_{n,1}$ to time $t_{n,2}$, only the control signal $S_n$ is made high among the control signals $S_1$ to $S_N$. During the time period $T_1$, the control signal Sel1 is made high, while the control signal Sel2 is made low. Also, from the time period $T_2$ through the time period $T_N$, the control signal Sel1 is made low, while the control signal Sel2 is made high.

During the time period $T_1$ from time $t_{1,1}$ to time $t_{1,2}$, only the control signal $S_1$ is made high among the control signals $S_1$ to $S_N$, so that the switches $SW_{31,1}$ and $SW_{32,0}$ in the difference operating section 30 are closed. Also, the control signal Sel1 is made high, so that the switch $SW_{41}$ is closed. When the switch $SW_{31,1}$ is closed, the voltage value $V_1$ held by the holding circuit $21_1$ is inputted to the subtracting circuit 33 through the switch $SW_{31,1}$ and the wiring L1. Also, when the switch $SW_{32,0}$ is closed, the ground potential is inputted to the subtracting circuit 33 through the switch $SW_{32,0}$ and the wiring L2. In the subtracting circuit 33, the ground potential is subtracted from the voltage value $V_1$, and the subtracted voltage value $V_1$ is outputted. Then, in the A/D converting section 40, the voltage value $V_1$ outputted from the subtracting circuit 33 is converted into an M-bit digital value using the voltage value $V_{FS1}$ inputted through the switch $SW_{41}$ as a full scale.

During the time period $T_n$ from time $t_{n,1}$ to time $t_{n,2}$ ($n \neq 1$), only the control signal $S_n$ is made high among the control signals $S_1$ to $S_N$, so that the switches $SW_{31,n}$ and $SW_{32,n-1}$ in the difference operating section 30 are closed. Also, the control signal Sel2 is made high, so that the switch $SW_{42}$ is closed. When the switch $SW_{31,n}$ is closed, the voltage value $V_n$ held by the holding circuit $21_n$ is inputted to the subtracting circuit 33 through the switch $SW_{31,n}$ and the wiring L1. Also, when the switch $SW_{32,n-1}$ is closed, the voltage value $V_{n-1}$ held by the holding circuit $21_{n-1}$ is inputted to the subtracting circuit 33 through the switch $SW_{32,n-1}$ and the wiring L2. In the subtracting circuit 33, the voltage value $V_{n-1}$ is subtracted from the voltage value $V_n$, and a voltage value $U_n$ corresponding to the subtraction result is outputted. Then, in the A/D converting section 40, the voltage value $U_n$ outputted from the subtracting circuit 33 is converted into an M-bit digital value using the voltage value $V_{FS2}$ inputted through the switch $SW_{42}$ as a full scale.

That is, during the time period $T_1$, the A/D converting section 40 converts the voltage value $V_1$ corresponding to the amount of incident light to the first photodiode $PD_1$ into an M-bit digital value using the voltage value $V_{FS1}$ as a full scale. Also, during each time period $T_n$ ($n \neq 1$), the difference operating section 30 calculates a voltage value $U_n$ according to the difference ($V_n-V_{n-1}$) between voltage values $V_n$ and $V_{n-1}$ that correspond to the amount of incident light to the respective photodiodes $PD_n$ and $PD_{n-1}$, and then the A/D converting section 40 converts the voltage value $U_n$ into an M-bit digital value using the voltage value $V_{FS2}$ as a full scale.

Figure 4:
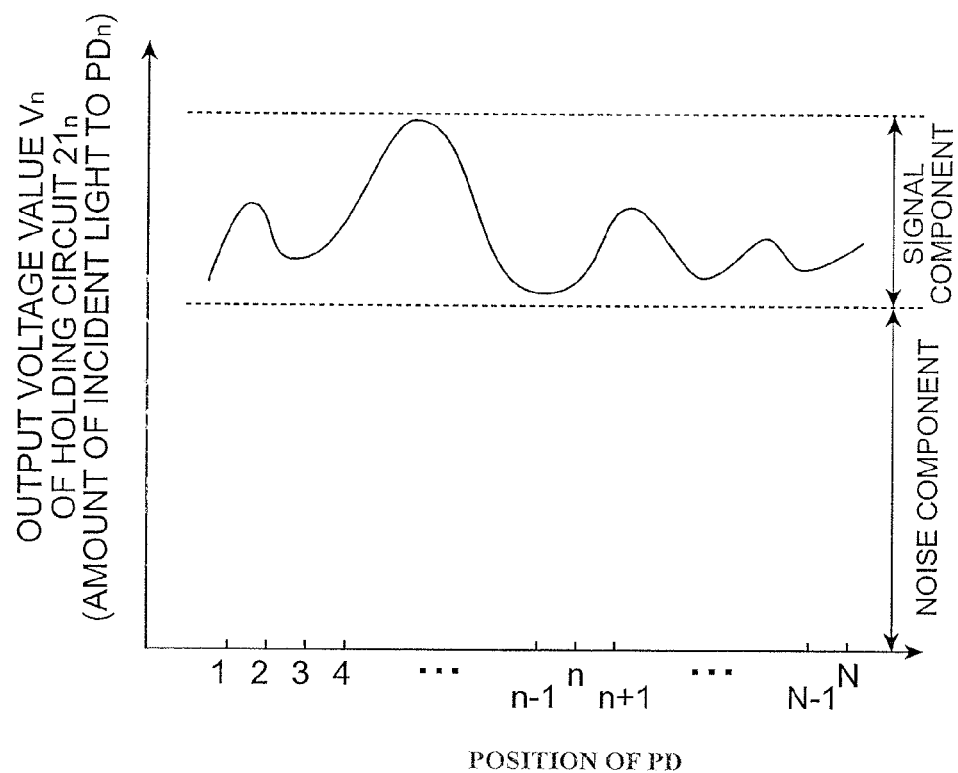
FIG. 4 is a view showing the intensity distribution of light to be detected by the sensor apparatus according to the first embodiment.

Therefore, as shown in FIG. 4, even when significant noise components (disturbing light components, background light components) may be superimposed on signal components that are supposed to be detected in the intensity distribution of light to be detected by the sensor apparatus 1, the sensor apparatus 1 can obtain digital values of the signal components with a high accuracy using an A/D conversing circuit with the outputted digital value thereof having a small number of bits of M as the A/D converting section 40.

That is, the maximum value of the difference ($V_n-V_{n-1}$) between two adjacent voltage values $V_n$ and $V_{n-1}$ among the voltage values $V_1$ to $V_N$ outputted from the respective holding circuits $21_1$ to $21_N$ is smaller than the maximum value of the voltage values $V_1$ to $V_N$. Hence, the voltage value $V_{FS2}$ to be used by the A/D converting section 40 as a full scale during the time period $T_n$ ($n \neq 1$) is set to the maximum value of the difference ($V_n-V_{n-1}$) or a value somewhat greater than the maximum value) or to the difference between the maximum and minimum values of signal components included in the voltage values $V_1$ to $V_N$ (or a value somewhat greater than the difference). Thus, in the A/D converting section 40, the voltage value $V_{FS2}$ to be used as a full scale is set appropriately and a voltage value $U_n$ corresponding to the difference ($V_n-V_{n-1}$) is converted into a digital value. Therefore, the digital value to be outputted from the A/D converting section 40 represents signal components with a high accuracy, though having a small number of bits of M.

Meanwhile, the maximum value of the voltage values $V_1$ to $V_N$ outputted from the respective holding circuits $21_1$ to $21_N$ is larger. Hence, the voltage value $V_{FS1}$ to be used by the A/D converting section 40 as a full scale during the time period $T_1$ is set to the maximum value of the voltage values $V_1$ to $V_N$ (or a value somewhat greater than the maximum value) that is greater than the voltage value $V_{FS2}$. Thus, in the A/D converting section 40, the voltage value $V_{FS1}$ to be used as a full scale is set appropriately and the voltage value $V_1$ is converted into a digital value. Therefore, the digital value to be outputted from the A/D converting section 40 represents the sum of signal components and noise components (disturbing light components, background light components), though having a small number of bits of M.

As described heretofore, the sensor apparatus 1 according to the first embodiment can obtain digital values of signal components with a high accuracy using an A/D conversing circuit with the outputted digital value thereof having a small number of bits of M as the A/D converting section 40. Therefore, the A/D converting section 40 results in a short conversion time, small power consumption, and small circuit scale. Also, even in the case of performing A/D conversion processing in parallel due to the requirement of performing the A/D conversion processing within a certain time period, the number of A/D converting sections for the parallel processing may be small, which also results in a small power consumption and small circuit scale.

Second Embodiment

Figure 5:
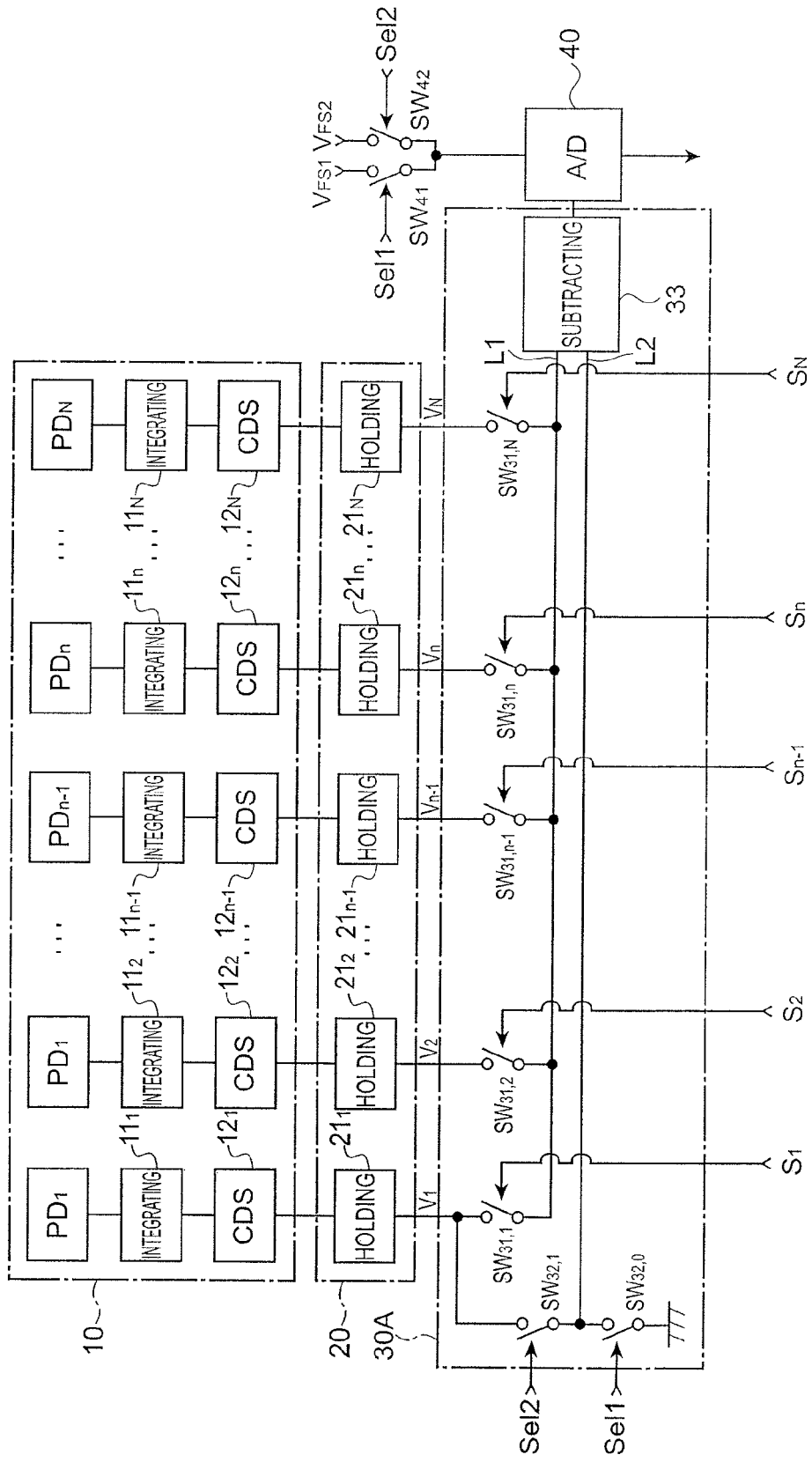
FIG. 5 is a view showing the overall configuration of a sensor apparatus according to a second embodiment of the present invention.
Figure 6:
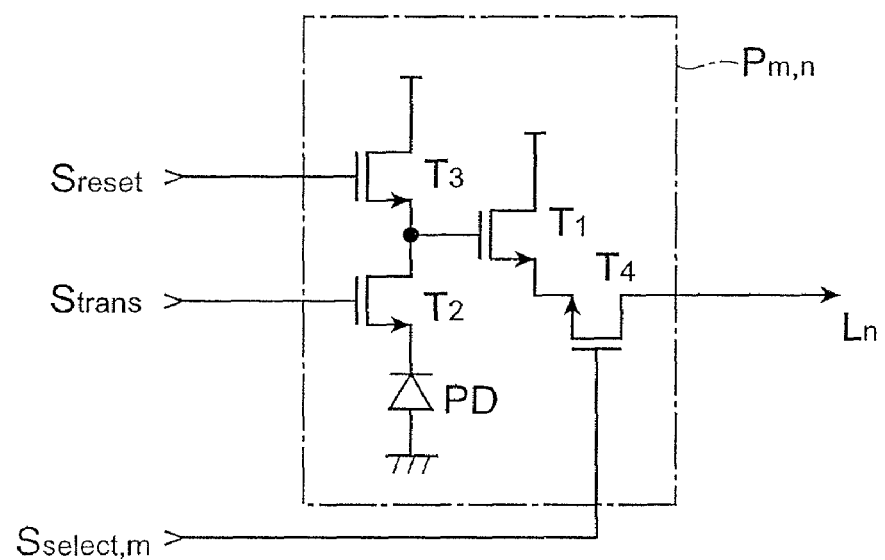
FIG. 6 is a circuit diagram of an APS circuit included in each pixel, showing the partial configuration of a sensor apparatus according to a modified example of the present invention.

Next, a sensor apparatus according to a second embodiment of the present invention will be explained. FIG. 5 is a view showing the overall configuration of the sensor apparatus according to the second embodiment of the present invention. The sensor apparatus 2 shown in FIG. 5 comprises a sensor array section 10, a holding section 20, a difference operating section 30A, and an A/D converting section 40. As compared with the configuration of the sensor apparatus 1 according to the above-described first embodiment (FIGS. 1 and 2), the sensor apparatus 2 according to the second embodiment is different from the first embodiment in that the difference operating section 30A is provided instead of the difference operating section 30.

The difference operating section 30A includes switches $SW_{31,1}$ to $SW_{31,N}$, switches $SW_{32,0}$ and $SW_{32,1}$, and a subtracting circuit 33. The output terminal of the holding circuit $21_n$ is connected to a wiring L1 via the switch $SW_{31,n}$. The output terminal of the first holding circuit $21_1$ is connected to a wiring L2 via the switch $SW_{32,1}$. Also, the wiring L2 is connected with the ground potential via the switch $SW_{32,0}$. The switch $SW_{31,n}$ opens and closes based on the level of a control signal $S_n$, and the switch $SW_{32,0}$ opens and closes based on the level of a control signal Sel1, while the switch $SW_{32,1}$ opens and closes based on the level of a control signal Sel2. The subtracting circuit 33 outputs a voltage value corresponding to the difference between voltage values to be inputted through the respective wirings L1 and L2.

Next, the operation of the difference operating section 30A and the A/D converting section 40 in the sensor apparatus 2 according to the second embodiment will be explained. The timing chart for explaining the operation of the difference operating section 30A and the A/D converting section 40 in the sensor apparatus 2 according to the second embodiment is the same as in FIG. 3.

During the time period $T_1$ from time $t_{1,1}$ to time $t_{1,2}$, only the control signal $S_1$ is made high among the control signals $S_1$ to $S_N$, so that the switch $SW_{31,1}$ in the difference operating section 30A is closed. Also, the control signal Sel1 is made high, so that the switches $SW_{32,0}$ and $SW_{41}$ are closed. When the switch $SW_{31,1}$ is closed, the voltage value $V_1$ held by the holding circuit $21_1$ is inputted to the subtracting circuit 33 through the switch $SW_{31,1}$ and the wiring L1. Also, when the switch $SW_{32,0}$ is closed, the ground potential is inputted to the subtracting circuit 33 through the switch $SW_{32,0}$ and the wiring L2. In the subtracting circuit 33, the ground potential is subtracted from the voltage value $V_1$, and the subtracted voltage value $V_1$ is outputted. Then, in the A/D converting section 40, the voltage value $V_1$ outputted from the subtracting circuit 33 is converted into an M-bit digital value using the voltage value $V_{FS1}$ inputted through the switch $SW_{41}$ as a full scale.

During the time period $T_n$ from time $t_{n,1}$ to time $t_{n,2}$ ($n \neq 1$), only the control signal $S_n$ is made high among the control signals $S_1$ to $S_N$, so that the switch $SW_{31,n}$ in the difference operating section 30A is closed. Also, the control signal Sel2 is made high, so that the switch $SW_{42}$ is closed. When the switch $SW_{31,n}$ is closed, the voltage value $V_n$ held by the holding circuit $21_n$ is inputted to the subtracting circuit 33 through the switch $SW_{31,n}$ and the wiring L1. Also, when the switch $SW_{32,1}$ is closed, the voltage value $V_1$ held by the holding circuit $21_1$ is inputted to the subtracting circuit 33 through the switch $SW_{32,1}$ and the wiring L2. In the subtracting circuit 33, the voltage value $V_1$ is subtracted from the voltage value $V_n$, and a voltage value $W_n$ corresponding to the subtraction result is outputted. Then, in the A/D converting section 40, the voltage value $W_n$ outputted from the subtracting circuit 33 is converted into an M-bit digital value using the voltage value $V_{FS2}$ inputted through the switch $SW_{42}$ as a full scale.

That is, during the time period $T_1$, the A/D converting section 40 converts the voltage value $V_1$ corresponding to the amount of incident light to the first photodiode $PD_1$ into an M-bit digital value using the voltage value $V_{FS1}$ as a full scale. Also, during the time period $T_n$ ($n\neq 1$), the difference operating section 30A calculates a voltage value $W_n$ corresponding to the difference ($V_n$-$V_1$) between voltage values $V_n$ and $V_1$ that correspond to the amount of incident light to the respective photodiodes $PD_n$ and $PD_1$, and then the A/D converting section 40 converts the voltage value $W_n$ into an M-bit digital value using the voltage value $V_{FS2}$ as a full scale.

Therefore, as shown in FIG. 4, even when significant noise components (disturbing light components, background light components) may be superimposed on signal components that are supposed to be detected in the intensity distribution of light to be detected by the sensor apparatus 2, the sensor apparatus 2 can obtain digital values of the signal components with a high accuracy using an A/D conversing circuit with the outputted digital value thereof having a small number of bits of M as the MD converting section 40.

That is, the maximum value of the voltage value $W_n$ to be obtained by a difference operation from the voltage values $V_1$ to $V_N$ outputted from the respective holding circuits $21_1$ to $21_N$ is smaller than the maximum value of the voltage values $V_1$ to $V_N$. Hence, the voltage value $V_{FS2}$ to be used by the A/D converting section 40 as a full scale during the time period $T_n$ ($n\neq 1$) is set to the maximum value of the voltage value $W_n$ (or a value somewhat greater than the maximum value) or to the difference between the maximum and minimum values of signal components included in the voltage values $V_1$ to $V_N$ (or a value somewhat greater than the difference). Thus, in the A/D converting section 40, the voltage value $V_{FS2}$ to be used as a full scale is set appropriately and a voltage value $W_n$ corresponding to the difference ($V_n$-$V_1$) is converted into a digital value. Therefore, the digital value to be outputted from the A/D converting section 40 represents signal components with a high accuracy, though having a small number of bits of M.

Meanwhile, the maximum value of the voltage values $V_1$ to $V_N$ outputted from the respective holding circuits $21_1$ to $21_N$ is larger. Hence, the voltage value $V_{FS1}$ to be used by the A/D converting section 40 as a full scale during the time period $T_1$ is set to the maximum value of the voltage values $V_1$ to $V_N$ (or a value somewhat greater than the maximum value) that is greater than the voltage value $V_{FS2}$. Thus, in the A/D converting section 40, the voltage value $V_{FS1}$ to be used as a full scale is set appropriately and the voltage value $V_1$ is converted into a digital value. Therefore, the digital value to be outputted from the A/D converting section 40 represents the sum of signal components and noise components (disturbing light components, background light components), though having a small number of bits of M.

As described above, the sensor apparatus 2 according to the second embodiment can obtain digital values of signal components with a high accuracy using an A/D conversing circuit with the outputted digital value thereof having a small number of bits of M as the A/D converting section 40. Therefore, the A/D converting section 40 results in a short conversion time, small power consumption, and small circuit scale. Also, even in the case of performing A/D conversion processing in parallel due to the requirement of performing the A/D conversion processing within a certain time period, the number of A/D converting sections for the parallel processing may be small, which also results in a small power consumption and small circuit scale.

(Exemplary Variation)

The present invention is not restricted to the above-described first and second embodiments, and various modifications may be made. For example, although the sensor apparatuses according to the above-described first and second embodiments are image pickup apparatuses including a plurality of photodiodes that are arranged one-dimensionally, the sensor apparatus according to the present invention may be an image pickup apparatus including a plurality of photodiodes that are arranged two-dimensionally. Further, the sensor apparatus according to the present invention may be an imaging apparatus in which each pixel includes an APS (Active Pixel Sensor) circuit shown in FIG. 6 as well as a plurality of photodiodes and the pixels are arranged one- or two-dimensionally. Also, the sensor apparatus according to the present invention is not restricted to an image pickup apparatus, but may include a plurality of sensor elements for detecting the amount of another sensing parameter (e.g. temperature, displacement).

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The sensor apparatus according to the present invention is applicable to, for example, an image pickup apparatus including a plurality of photodiodes that are arranged one- or two-dimensionally.

The invention claimed is:

1. A sensor apparatus comprising:
a sensor array section including N sensor elements (N represents an integer of 2 or more) and adapted to output a voltage value $V_n$ in response to the result of sensing by the n-th sensor element ("n" represents any integer of 1 or more but N or less) among said N sensor elements;
a difference operating section including:
a subtracting circuit having first and second input terminals for respectively inputting a specific voltage value $V_{n0}$ and the voltage value $V_n$ among N voltage values $V_1$ to $V_N$ outputted from said sensor array section, and an output terminal for outputting a voltage value $W_n$ corresponding to the difference ($V_n$-$V_{nO}$) between the specific voltage value $V_{nO}$ and the voltage value $V_n$; and
a switching device having N first switch elements disposed on all lines connecting the first input terminal of said subtracting circuit to all N output terminals of said sensor array section for respectively outputting the N voltage values $V_1$ to $V_N$, and N second switch elements connecting the second input terminal of said subtracting circuit to the all N output terminals of said sensor array section; and
an A/D converting section converting the voltage value $W_n$ outputted from said difference operating section into a digital value.

2. A sensor apparatus according to claim 1, wherein said A/D converting section converts the specific voltage value $V_{n0}$ into a digital value.

3. A sensor apparatus according to claim 1, further comprising a holding section once holding the N voltage values $V_1$ to $V_N$ outputted from said sensor array section, and
wherein said difference operating section outputs the voltage value $W_n$ based on the N voltage values $V_1$ to $V_N$ held by said holding section.

4. A sensor apparatus according to claim 1, wherein each of said N sensor elements includes a photodiode.

* * * * *